US009734760B2

(12) United States Patent
Wu et al.

(10) Patent No.: US 9,734,760 B2
(45) Date of Patent: Aug. 15, 2017

(54) SENSING CIRCUIT FOR EXTERNAL COMPENSATION, SENSING METHOD THEREOF AND DISPLAY APPARATUS

(71) Applicant: BOE TECHNOLOGY GROUP CO., LTD., Beijing (CN)

(72) Inventors: Zhongyuan Wu, Beijing (CN); Liye Duan, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 51 days.

(21) Appl. No.: 14/354,779

(22) PCT Filed: Jul. 23, 2013

(86) PCT No.: PCT/CN2013/079934
§ 371 (c)(1),
(2) Date: Apr. 28, 2014

(87) PCT Pub. No.: WO2014/173026
PCT Pub. Date: Oct. 30, 2014

(65) Prior Publication Data

US 2015/0008841 A1 Jan. 8, 2015

(30) Foreign Application Priority Data

Apr. 25, 2013 (CN) .......................... 2013 1 0148727

(51) Int. Cl.
*G06F 3/038* (2013.01)
*G09G 3/325* (2016.01)
(Continued)

(52) U.S. Cl.
CPC ........... *G09G 3/325* (2013.01); *G09G 3/3291* (2013.01); *G09G 3/3233* (2013.01);
(Continued)

(58) Field of Classification Search
USPC ............... 345/211, 214, 212, 204, 205, 173; 315/169.3, 291, 209 R
See application file for complete search history.

(56) References Cited

U.S. PATENT DOCUMENTS 5,648,791 A 7/1997 Date et al.
5,838,113 A * 11/1998 Mihara .................. H05B 33/08 315/169.3
(Continued)

FOREIGN PATENT DOCUMENTS

CN 101552841 A 10/2009
CN 101587271 A 11/2009
(Continued)

OTHER PUBLICATIONS

CN203150074U.*
(Continued)

*Primary Examiner* — Minh D A
(74) *Attorney, Agent, or Firm* — Ladas & Parry LLP

(57) ABSTRACT

A sensing circuit for external compensation, a sensing method thereof and a display apparatus, the sensing circuit for external compensation comprises a differential amplifier (9), a first capacitor (4), a second capacitor (8) and an output voltage controlling circuit (10) for the first capacitor; a negative input terminal of the differential amplifier (9) is connected with a display panel (1), a positive input terminal thereof is connected with a reference voltage, and an output terminal thereof is connected with an output terminal of the output voltage controlling circuit (10) for the first capacitor; the output voltage controlling circuit (10) for the first capacitor is used for enabling an output voltage of the first capacitor (4) in a subsequent current integral stage to vary based on the reference voltage. The sensing circuit for external compensation, the sensing method thereof and the display apparatus according to embodiments of the present
(Continued)

disclosure can store by using the capacitor an offset voltage of the amplifier in an initial stage to eliminate the differences in the voltage outputs caused by the offsets of the amplifiers among different channels and enhance the accuracy of the voltage output.

6 Claims, 2 Drawing Sheets

(51) Int. Cl.
*G09G 3/3291* (2016.01)
*G09G 3/3233* (2016.01)

(52) U.S. Cl.
CPC ............... *G09G 2300/0842* (2013.01); *G09G 2310/0291* (2013.01); *G09G 2320/029* (2013.01); *G09G 2320/0233* (2013.01); *G09G 2320/0295* (2013.01); *G09G 2320/045* (2013.01)

(56) References Cited

U.S. PATENT DOCUMENTS

| | | | |
|---|---|---|---|
| 6,078,643 | A | 6/2000 | Vogelsong et al. |
| 6,756,962 | B1 | 6/2004 | Akimoto et al. |
| 7,973,686 | B2 | 7/2011 | Nishimura |
| 2005/0067943 | A1 | 3/2005 | Sakaguchi et al. |
| 2006/0015272 | A1 | 1/2006 | Giraldo et al. |
| 2007/0182488 | A1 | 8/2007 | Imayama |
| 2008/0036708 | A1 | 2/2008 | Shirasaki et al. |
| 2009/0244056 | A1 | 10/2009 | Tsuchi |
| 2009/0289919 | A1* | 11/2009 | Jung ..................... G06F 3/0412 345/175 |
| 2010/0033458 | A1 | 2/2010 | Shimizu et al. |
| 2010/0045650 | A1 | 2/2010 | Fish et al. |
| 2010/0053045 | A1 | 3/2010 | Fish et al. |
| 2010/0096997 | A1 | 4/2010 | Ahn et al. |
| 2011/0080214 | A1 | 4/2011 | Tsuchi |
| 2011/0199366 | A1 | 8/2011 | Tsuchi |
| 2012/0319609 | A1* | 12/2012 | Choi .................. H05B 33/0812 315/210 |
| 2015/0008841 | A1 | 1/2015 | Wu et al. |
| 2015/0379940 | A1 | 12/2015 | Kishi |

FOREIGN PATENT DOCUMENTS

| | | | |
|---|---|---|---|
| CN | 101630944 | A | 1/2010 |
| CN | 102064777 | A | 5/2011 |
| CN | 203179477 | U | 9/2013 |
| JP | 6089114 | | 5/1985 |
| JP | 0594159 | A | 4/1993 |
| JP | 2005-107129 | A | 4/2005 |
| JP | 2007-214798 | A | 8/2007 |
| JP | 2007-322133 | A | 12/2007 |
| JP | 2010-511182 | A | 4/2010 |
| JP | 2010-511183 | A | 4/2010 |
| KR | 1020010105154 | A | 11/2001 |
| KR | 100807504 | | 2/2008 |
| KR | 100807504 | B1 | 2/2008 |
| KR | 20080106228 | A | 12/2008 |
| KR | 20090121040 | A | 11/2009 |
| KR | 20120138876 | A | 12/2012 |
| TW | 421407 | u | 2/2001 |

OTHER PUBLICATIONS

Korean Office Action dated May 12, 2015; Appln. No. 10-2014-7013064.
International Search Report Appln. No. PCT/CN2013/079934; Dated Jan. 30, 2014.
First Chinese Office Action Appln. No. 201310148727.X; Dated Oct. 10, 2014.
Second Chinese Office Action dated Mar. 3, 2015; Appln. No. 201310148727.X.
International Preliminary Report on Patentability issued Oct. 27, 2015; PCT/CN2013/079934.
Glen Crisebois; "Using a Differential I/O Amplifier in Single-Ended Applications", Linear Technology Magazine, Dec. 2009; pp. 32 & 37.
International Search Report and Written Opinion both dated Dec. 12, 2013; PCT/CN2013/074820.
First Chinese Office Action dated Jul. 22, 2014; Appln. No. 201310082006.3.
Second Chinese Office Action dated Nov. 4, 2014; Appln, No. 201310082006.3.
First Korean Office Action dated Mar. 23, 2015; Appln. No. 10-2014-7007724.
Korean NOA dated Sep. 24, 2015; Appln. 10-2014-7007724.
USPTO NFOA dated Mar. 22, 2016 in connection with U.S. Appl. No. 14/342,023.
Extended European Search Report dated Jan. 20, 2017; Appln. No. 13848101.5-1903/2991066 PCT/CN2013079934.
USPTO FOA dated Jul. 11, 2016 in connection with U.S. Appl. No. 14/342,023.
USPTO NFPA dated Sep. 8, 2016 in connection with U.S. Appl. No. 14/342,023.
Japanese Office Action dated Apr. 17, 2017; Appln. No. 2016-509262.

* cited by examiner

SENSING CIRCUIT FOR EXTERNAL COMPENSATION, SENSING METHOD THEREOF AND DISPLAY APPARATUS

TECHNICAL FIELD

The present disclosure relates to a field of organic light-emitting display technique, and particularly, to a sensing circuit for external compensation, a sensing method thereof and a display apparatus.

BACKGROUND

As a current-type light-emitting device, an Organic Light-Emitting Diode (OLED) has been more and more used in a display apparatus with high performance. A traditional Passive Matrix OLED requires a shorter driving time for a single pixel with the increasing of display size, thereby a transient current should be increased and power consumption increases. Also, an application of a great current may lead to an over-large voltage drop on wires of nanometer Indium Tin Oxides (ITO), and cause an over-high operation voltage of the OLED, which may in turn decrease its efficiency. As compared, an Active Matrix OLED (AMOLED) may settle these problems perfectively by scanning input OLED currents progressively by means of switch transistors.

In a design for a backboard of the AMOLED, a major problem needed to be settled is the non-uniformity in brightness among pixel unit circuits.

Firstly, the AMOLED constructs the pixel unit circuit with Thin-Film Transistors (TFTs) to provide corresponding currents for OLED devices. In the prior art, Low Temperature Poly-Silicon TFTs (LTPS TFTs) or Oxide TFTs are mostly used. As compared with a general amorphous-Si TFT, the LTPS TFT and the Oxide TFT have higher mobility and more stable performance, and are more suitable to be applied to the AMOLED display. However, the LTPS TFT manufactured on a glass substrate with a large area often has non-uniformity in electrical parameters such as a threshold voltage, the mobility, and the like because of the limitation on a crystallization process. Such non-uniformity may be transformed as a current difference and a brightness difference of the OLED display devices, and be perceived by human eyes, that is, a Mura phenomenon. The Oxide TFT has a good uniformity in the process, but like a-Si TFT, its threshold voltage would drift under a long time pressure and a high temperature and amounts of the drift in the thresholds of the TFTs in respective parts on a panel would be different because displayed pictures are different, which may lead to differences in the display brightness. Because such difference relates to images displayed previously, it is generally shown as an image sticking phenomenon.

Secondly, in the display application with a large size, because power lines of the backboard have certain resistances and the driving current for all pixels are provided by an ARVDD power supply, a power supply voltage at a region close to a supply position of the ARVDD power supply is higher than that at a region far away from the supply position in the backboard, and such phenomenon is called as voltage drop of power supply (IR Drop). The IR Drop may also lead to the current differences among the different regions and then generate the Mura phenomenon when displaying, since the voltage of the ARVDD power supply is associated with the current. The LTPS process constructing the pixel unit with P-Type TFTs is especially sensitive to this problem, because the storage capacitor thereof is connected between the ARVDD power supply and gates of the TFTs, and a voltage Vgs at the gate of the TFT would be affected directly when the voltage of the ARVDD power supply changes.

Thirdly, the OLED device may also cause the non-uniformity in the electric performance because of the non-uniformity in thicknesses of the films in evaporation. For the a-Si or Oxide TFT process constructing the pixel unit with N-Type TFTs, the storage capacitor thereof is connected between a gate of a driving TFT and an anode of the OLED, and the gate voltages Vgs applied actually to the TFTs would be different if the voltages at the anodes of the OLEDs for respective pixels are different when a data voltage is transferred to the gates, such that the different driving currents may cause the difference in the display brightness.

The AMOLED may be classified into three major classes based on the driving types: a digital type, a current type, and a voltage type. Herein, the digital type driving method realizes gray scales by a manner of controlling driving timing with the TFTs served as switches without compensating for the non-uniformity, but its operation frequency would increase doubled and redoubled as the display size grows, which leads to a great power consumption, and reach a physical limitation of the design within a certain range, therefore it is not suitable for the display application with the large size. The current type driving method realizes the gray scales by a manner of providing directly the driving transistors with currents having different values, and may compensate for the non-uniformity of the TFT and the IR drop better, but when a signal having a low gray scale is written, an over-long write time may be raised because a small current charges a big parasitic capacitor on the data lines, such problem is especially severe and cannot be overcome in the display with the large size. The voltage type driving method is similar to a driving method for the traditional Active Matrix Liquid Crystal Display (AMLCD) and provides a voltage signal representing the gray scale by a driving IC, and the voltage signal may be transformed to a current signal of the driving transistor inside the pixel circuit so as to drive the OLED to realize the luminance gray scales. Such method has advantages of a quick driving speed and simple implementation, which is suitable for driving the panel with the large size and widely used in industry, however it need to design additional TFTs and capacitor devices to compensate for the non-uniformity of the TFTs, the IR Drop and the non-uniformity of the OLED.

FIG. 1 illustrates a typical pixel unit circuit in the prior art. As illustrated in FIG. 1, the typical pixel unit circuit comprises two thin film transistors T2 and T1, and one capacitor C. This circuit is a typical structure for a pixel circuit of a voltage driving type (2T1C). Herein the thin film transistor T2 operates as a switch transistor, transfers a voltage on a data line to the gate of the thin film transistor T1, which operates as a driving transistor, and the driving transistor transforms the data voltage to a corresponding current to be supplied to an OLED device. The driving transistor T1 should be in a saturation zone when it operate normally, and provide a constant current during a scanning period of time for one row. The current may be expressed as follows:

$$I_{OLED}=\frac{1}{2}\mu_n\cdot C_{OX}\cdot\frac{W}{L}\cdot(V_{data}-V_{OLED}-V_{thn})^2.$$

where $\mu_n$ is a mobility of carriers, $C_{OX}$ is a capacitance in an oxide layer at a gate, $$\frac{W}{L}$$

is a width-length ratio of the transistor, $V_{data}$ is a signal voltage on the data line, $V_{OLED}$ is an operation voltage of the OLED and is shared by all pixel unit circuits, $V_{thn}$ is a threshold voltage of the TFT, which is a positive value for an enhanced TFT and is a negative value for a depletion TFT. It can be seen from the above equation that the currents would be different if the $V_{thn}$ is different among the different pixel units. If the $V_{thn}$ of a pixel drifts with time, the currents before and after drifting would be different, which results in the image sticking. Also, the difference in the current is also caused by difference in the operation voltage of the OLEDs because of non-uniformity in the OLED devices.

There are many pixel structures for compensating for the non-uniformity of $V_{thn}$, the drifting and the non-uniformity of the OLEDs, and they are divided into two classes, an internal compensation and an external compensation, generally. Herein, a major difficulty in the designing of the external compensation is a current sensing circuit, and the pixels of each column (Pixel) in the display panel (PANEL) correspond to, generally, one sensing circuit unit, respectively, in order to increasing a read speed. A major function of the sensing circuit is to convert the current output or input into a voltage signal, which is transferred to the subsequent ADC module to be further processed. A traditional sensing circuit is composed of current integrators, and the converted output voltage is associated with an offset voltage of an amplifier. The offset voltage of the amplifier in each of the sensing circuit units is different from each other generally because of process errors and system errors, therefore an accuracy of the output voltage may decrease, such that the differences in the currents among the respective columns in the display panel can not be compared exactly.

In order to settle the above problems, the invention has made a beneficial improvement.

SUMMARY

Technique problems to be settled by the present disclosure are to provide a sensing circuit for external compensation, which is capable of eliminating differences in voltage outputs caused by the voltage offsets of the amplifiers among different channels and enhancing the accuracy of the voltage output, a sensing method thereof and a display apparatus.

The present disclosure may be implemented by means of solutions as follows. A sensing circuit for external compensation, comprising a differential amplifier, a first capacitor, a second capacitor and an output voltage controlling circuit for the first capacitor;

a negative input terminal of the differential amplifier is connected with a display panel, a positive input terminal thereof is connected with a reference voltage, and an output terminal thereof is connected with an output terminal of the output voltage controlling circuit for the first capacitor;

two ends of the first capacitor are connected with the negative input terminal of the differential amplifier and an input terminal of the output voltage controlling circuit for the first capacitor, respectively;

one end of the second capacitor is connected with the output terminal of the output voltage controlling circuit for the first capacitor, and the other end is grounded; and the output voltage controlling circuit for the first capacitor is used for enabling an output voltage of the first capacitor in a subsequent current integral stage to vary based on the reference voltage.

Herein, a first switch is disposed between the negative input terminal of the differential amplifier and the display panel, a second switch is disposed between the two ends of the first capacitor, and a third switch is disposed between the second capacitor and the output terminal of the output voltage controlling circuit for the first capacitor.

Further, the output voltage controlling circuit for the first capacitor comprises a first outputting circuit and a second outputting circuit;

an input terminal of the first outputting circuit is connected with the first capacitor, an output terminal of the first outputting circuit is connected with the output terminal of the differential amplifier; a fourth switch is disposed between the input terminal and the output terminal of the first outputting circuit; and an input terminal of the second outputting circuit is connected with the first capacitor, an output terminal of the second outputting circuit is connected with the reference voltage; a fifth switch is disposed between the input terminal and the output terminal of the second outputting circuit.

Optionally, all of the first, second, third, fourth and fifth switches are MOS transistors.

Embodiments of the present disclosure further provide a display apparatus comprising the sensing circuit for external compensation as described above.

The embodiments of the present disclosure further provide a sensing method of the above sensing circuit for external compensation, comprising steps of:

biasing the differential amplifier at an unity-gain state, and discharging the first capacitor;

charging or discharging the first capacitor by a current from a display panel, and enabling by the output voltage controlling circuit for the first capacitor the output voltage of the first capacitor to vary based on a reference voltage; and storing the voltage in a second capacitor.

As compared with the prior art and products, the embodiments of the present disclosure have advantages as follows.

The embodiments of the present disclosure store by using the first capacitor an offset voltage of the amplifier in an initial stage, by the output voltage controlling circuit for the first capacitor, so that the output voltage is independent of the offset voltage of the differential amplifier in the subsequent current integral stage, eliminate the differences in the outputs caused by the offset voltages of the amplifiers among different channels and enhance the accuracy of the voltage output.

DETAILED DESCRIPTION

Specific implementations of the present disclosure will be described in details below in connection with drawings.

Figure 1:
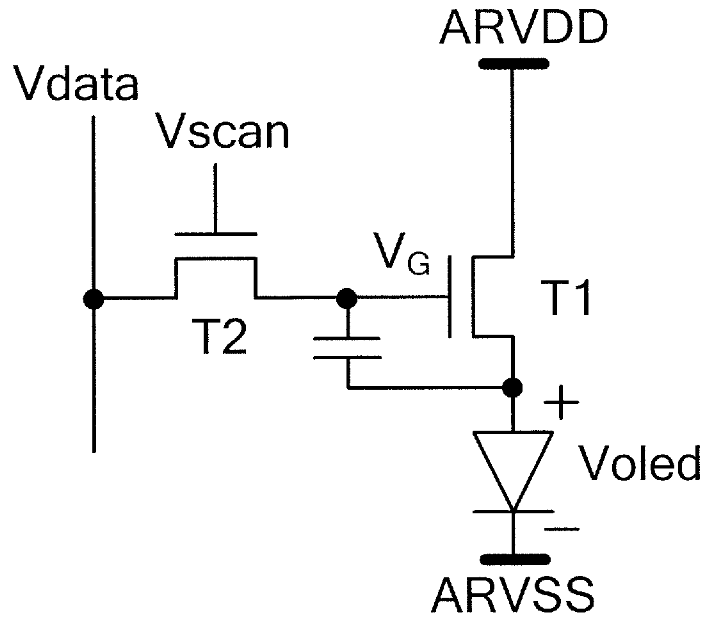
FIG. 1 is a circuit diagram of a conventional pixel unit circuit.
Figure 2:
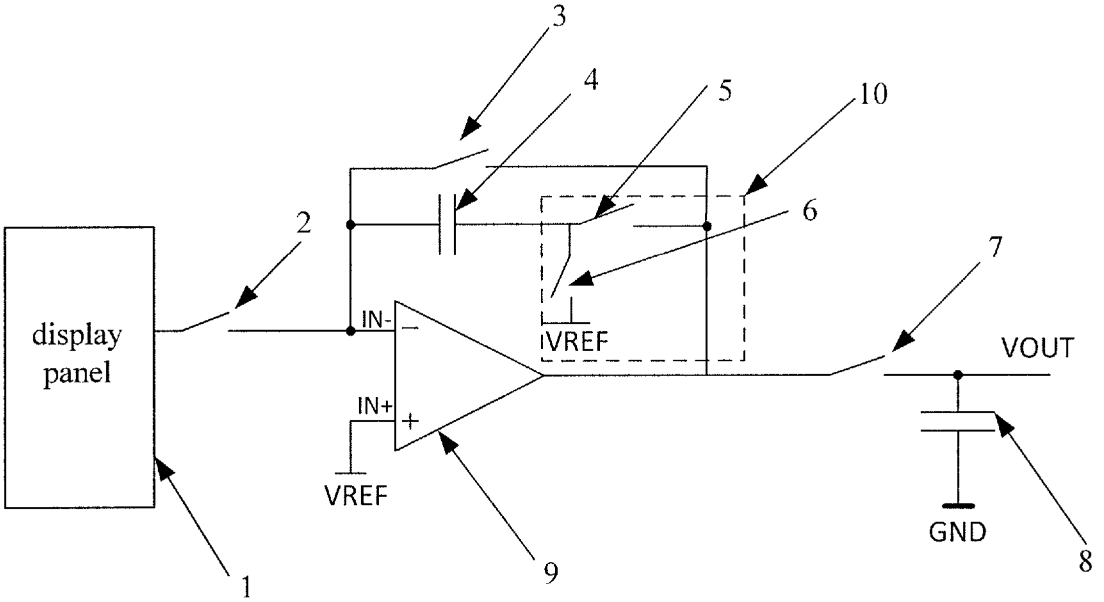
FIG. 2 is a circuit diagram of a sensing circuit for external compensation according to embodiments of the present disclosure.

As illustrated in FIG. 2, the present embodiment provides a current sensing circuit for external compensation applied in an Active Matrix Organic Light-Emitting Diode (AMOLED) display, that is, a sensing circuit for external compensation comprising a differential amplifier 9, a first capacitor 4, a second capacitor 8 and an output voltage controlling circuit 10 for the first capacitor.

A negative input terminal of the differential amplifier 9 is connected with a display panel 1 (PANEL), a positive input terminal is connected with a reference voltage (VREL), and an output terminal is connected with an output terminal of the output voltage controlling circuit 10 for the first capacitor.

Two ends of the first capacitor 4 are connected with the negative input terminal of the differential amplifier 9 and an input terminal of the output voltage controlling circuit 10 for the first capacitor, respectively.

One end of the second capacitor 8 is connected with the output terminal of the output voltage controlling circuit 10 for the first capacitor, and the other end is grounded.

The output voltage controlling circuit 10 for the first capacitor is used for enabling an output voltage of the first capacitor 4 in a subsequent current integral stage to vary based on the reference voltage.

In an example, a first switch 2 is disposed between the negative input terminal of the differential amplifier 9 and the display panel 1, a second switch 3 is disposed between the two ends of the first capacitor 4, and a third switch 7 is disposed between the second capacitor 8 and the output terminal of the output voltage controlling circuit 10 for the first capacitor.

Further, the output voltage controlling circuit 10 for the first capacitor may comprise a first outputting circuit and a second outputting circuit.

An input terminal of the first outputting circuit is connected with the first capacitor 4, an output terminal of the first outputting circuit is connected with the output terminal of the differential amplifier 9; a fourth switch 5 is disposed between the input terminal and the output terminal of the first outputting circuit.

An input terminal of the second outputting circuit is connected with the first capacitor 4, an output terminal of the second outputting circuit is connected with the reference voltage; a fifth switch 6 is disposed between the input terminal and the output terminal of the second outputting circuit.

Optionally, all of the first, second, third, fourth and fifth switches are MOS transistors.

The embodiments of the present disclosure further provide a display apparatus comprising the above sensing circuit for external compensation.

Figure 3:
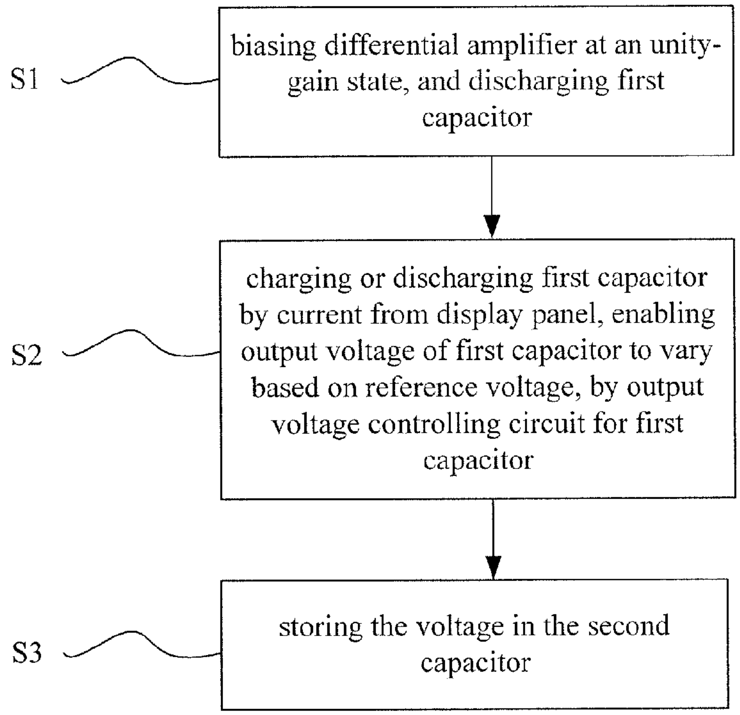
FIG. 3 is a diagram illustrating steps of a sensing method of the sensing circuit for external compensation according to the embodiments of the present disclosure.
Figure 4:
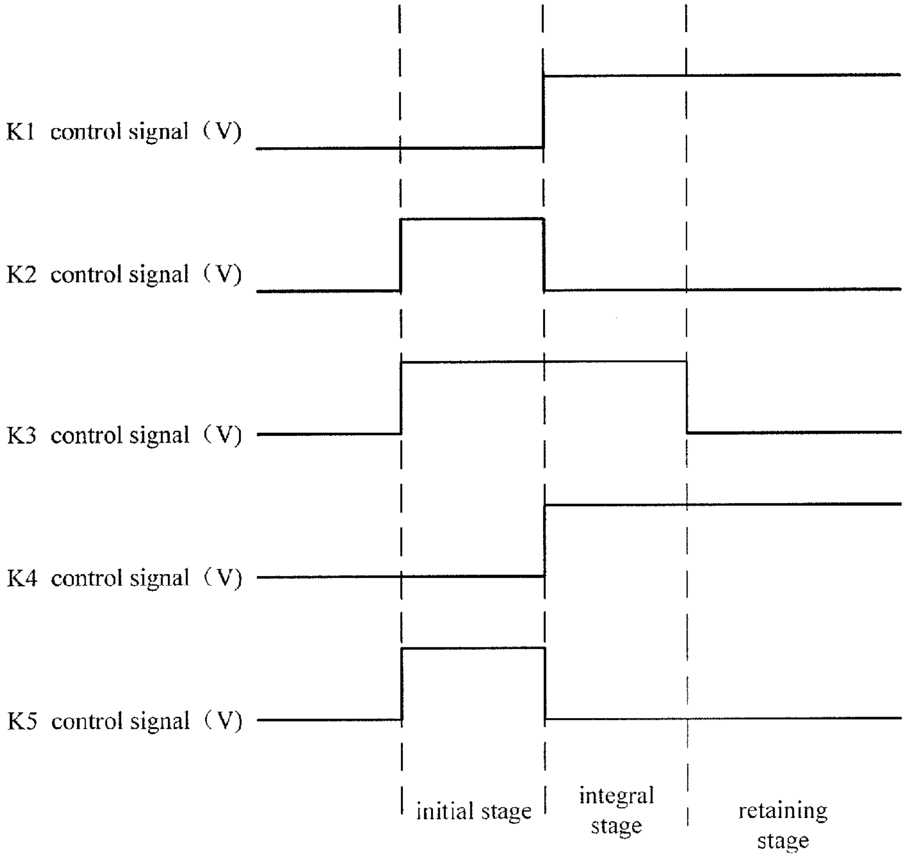
FIG. 4 is a timing comparison diagram of the output voltages in the sensing circuit for external compensation according to the embodiments of the present disclosure.

Further, as illustrated in FIG. 3, the embodiments of the present disclosure provide a sensing method of the above sensing circuit for external compensation, and in FIG. 4, a driving timing for the first switch, the second switch, the third switch, the fourth switch, and the fifth switch in the sensing circuit for external compensation is provided. All of the five switches utilize the MOS transistors, a level signal is connected with a gate of the MOS transistor so as to control turning on and turning off of the MOS transistor. Control signals for each of the MOS transistors are set as a high level and a low level, respectively, which represent the turn-on and the turn-off correspondingly. The first switch, the second switch, the third switch, the fourth switch and the fifth switch are denoted as K1, K2, K3, K4 and K5, respectively. In particular, the sensing method of the sensing circuit for external compensation according to the embodiments of the present disclosure performs processes as follows.

In step S1, a differential amplifier is biased at an unity-gain state, and the first capacitor is discharged. Particularly, this step is an initial resetting stage. The control signals for the switches K2, K3 and K5 are at the high level, so that these three switches are turned on; the control signals for the switches K1 and K4 are at the low level, so that these two switches are turned off. The differential amplifier is biased at the unity-gain state, the negative input terminal thereof is at VREF+VOS, which is the same as the output voltage, where VREF is the reference voltage, and VOS is an offset voltage of the differential amplifier. Two ends of the first capacitor 4 are connected with the negative input terminal of the differential amplifier and the voltage VREF respectively, and then a load charge across the two ends of the first capacitor 4 is:

$$(VREF+VOS-VREF)C1=VOS\cdot C1.$$

In step S2, the first capacitor 4 is charged or discharged by a current from a display panel, an output voltage controlling circuit 10 for the first capacitor enables an output voltage of the first capacitor 4 to vary based on the reference voltage. This step is an integral stage. In particular, the switches K1, K3 and K4 are turned on while the switches K2 and K5 are turned off. At this time, the pixel current from the inside of the display either charges or discharges the first capacitor 4, and a variation amount of the load charge on the first capacitor 4 is It, where I is the pixel current, and t is charging or discharging p time. Since the voltage at a left electrode plate of the first capacitor 4 is unchanged, which is still VREF+VOS, the voltage at a right electrode plate of the first capacitor 4, that is, the output voltage, is VOUT=VREF+It, where VOUT is the output voltage of the first capacitor 4. It can be seen that VOUT varies with the voltage VREF as the reference, and this is independent of the offset voltage of the differential amplifier.

In step S3, the voltage is stored in a second capacitor 8. This step is a retaining stage. At this time, the switch K3 is turned off, and the voltage VOUT is stored in the second capacitor 8 and then be further processed through the subsequent ADC conversion.

The above descriptions only illustrate the specific embodiments of the present invention, and the present invention is not limited to this. Those ordinarily skilled in the art can make variations and modifications without departing from the spirit and scope of the present invention, and thus all equivalences should be covered by the protection scope of the present invention. Thus, the protection scope of the present invention is defined by the claims.

What is claimed is:

1. A sensing circuit for external compensation, comprising a differential amplifier, a first capacitor, a second capacitor and an output voltage controlling circuit for the first capacitor;

a negative input terminal of the differential amplifier is connected with a display panel, a positive input terminal thereof is connected with a reference voltage, and an output terminal thereof is connected with an output terminal of the output voltage controlling circuit for the first capacitor;

one end of the first capacitor is connected with the negative input terminal of the differential amplifier, and the other end is connected with an input terminal of the output voltage controlling circuit for the first capacitor;

one end of the second capacitor is connected with the output terminal of the output voltage controlling circuit for the first capacitor, and the other end is grounded; and the output voltage controlling circuit for the first capacitor is used for enabling an output voltage of the first capacitor in a subsequent current integral stage to vary based on the reference voltage;

wherein a first switch is disposed between the negative input terminal of the differential amplifier and the display panel, a second switch is disposed between the two ends of the first capacitor, and a third switch is disposed between the second capacitor and the output terminal of the output voltage controlling circuit for the first capacitor; and wherein the output voltage controlling circuit for the first capacitor comprises a first outputting circuit and a second outputting circuit;

an input terminal of the first outputting circuit is connected with the first capacitor, an output terminal of the first outputting circuit is connected with the output terminal of the differential amplifier; a fourth switch is disposed between the input terminal and the output terminal of the first outputting circuit; and an input terminal of the second outputting circuit is connected with the first capacitor, an output terminal of the second outputting circuit is connected with the reference voltage; a fifth switch is disposed between the input terminal and the output terminal of the second outputting circuit.

2. The sensing method for external compensation of claim 1, wherein all of the first, second, third, fourth and fifth switches are MOS transistors.

3. A display apparatus comprising the sensing circuit for external compensation of the claim 1.

4. The display apparatus of claim 3, wherein a first switch is disposed between the negative input terminal of the differential amplifier and the display panel, a second switch is disposed between the two ends of the first capacitor, and a third switch is disposed between the second capacitor and to the output terminal of the output voltage controlling circuit for the first capacitor.

5. The display apparatus of claim 4, wherein the output voltage controlling circuit for the first capacitor comprises a first outputting circuit and a second outputting circuit;

an input terminal of the first outputting circuit is connected with the first capacitor, an output terminal of the first outputting circuit is connected with the output terminal of the differential amplifier; a fourth switch is disposed between the input terminal and the output terminal of the first outputting circuit; and an input terminal of the second outputting circuit is connected with the first capacitor, an output terminal of the second outputting circuit is connected with reference voltage; a fifth switch is disposed between the input terminal and the output terminal of the second outputting circuit.

6. The display apparatus of claim 5, wherein all of the first, second, third, fourth and fifth switches are MOS transistors.

* * * * *